United States Patent
Bacchiega et al.

(10) Patent No.: US 10,935,052 B2
(45) Date of Patent: Mar. 2, 2021

(54) SAFETY VALVE AND METHOD FOR CONTROLLING A HYDRAULIC CIRCUIT

(71) Applicant: LEONARDO S.P.A., Rome (IT)

(72) Inventors: Giacomo Bacchiega, Samarate (IT); Lucas Martin Piccinini, Samarate (IT); Roberto Bozzi, Samarate (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 16/621,158

(22) PCT Filed: Jun. 28, 2018

(86) PCT No.: PCT/EP2018/067488
§ 371 (c)(1),
(2) Date: Dec. 10, 2019

(87) PCT Pub. No.: WO2019/007815
PCT Pub. Date: Jan. 10, 2019

(65) Prior Publication Data
US 2020/0200196 A1    Jun. 25, 2020

(30) Foreign Application Priority Data

Jul. 3, 2017 (EP) .................................... 17179435

(51) Int. Cl.
*F16K 17/00* (2006.01)
*F15B 13/04* (2006.01)
(Continued)

(52) U.S. Cl.
CPC ........ *F15B 13/0402* (2013.01); *F15B 21/045* (2013.01); *F16K 17/00* (2013.01); *F16K 17/003* (2013.01); *G05D 23/02* (2013.01)

(58) Field of Classification Search
CPC .... F15B 13/0402; F15B 21/045; F15B 13/00; F15B 20/00; F16K 17/00; F16K 17/003; G05D 23/02
See application file for complete search history.

(56) References Cited

U.S. PATENT DOCUMENTS 2,740,586 A    4/1956   Chaniot
2,810,527 A    10/1957  Work
(Continued)

FOREIGN PATENT DOCUMENTS

EP    2 770 218    8/2014
GB    2 202 613    9/1988

*Primary Examiner* — F Daniel Lopez
*Assistant Examiner* — Daniel S Collins
(74) *Attorney, Agent, or Firm* — Leason Ellis LLP

(57) ABSTRACT

Described herein is a safety valve for a hydraulic circuit comprising a pump designed to supply a hydraulic fluid at a first pressure value to a pressure line, comprising: a chamber, which can be fluidically connected to the pressure line and is filled with the hydraulic fluid at a pressure value and a temperature value; and a casing with an opening, which can be connected to a reservoir of the hydraulic circuit; a shutter, which delimits the first chamber and can be displaced between a first position, in which it occludes the first opening, and a second position, in which it leaves the opening at least in part free; the valve comprises a thermally expandable element, which can be displaced, as a result of the temperature of the hydraulic fluid, between a first configuration that it assumes when the temperature of the hydraulic fluid is below the threshold value and a second configuration that it assumes when the temperature of the hydraulic fluid is above the temperature threshold value and in which it holds or displaces the first shutter in or towards the second position so as to reduce the pressure in the first chamber.

13 Claims, 5 Drawing Sheets

(51) Int. Cl.
*G05D 23/02* (2006.01)
*F15B 21/045* (2019.01)

(56) References Cited

U.S. PATENT DOCUMENTS

| | | |
|---|---|---|
| 7,165,950 B2 | 1/2007 | Fenny et al. |
| 2017/0204847 A1* | 7/2017 | Kimberlin ............ F16K 17/003 |

* cited by examiner

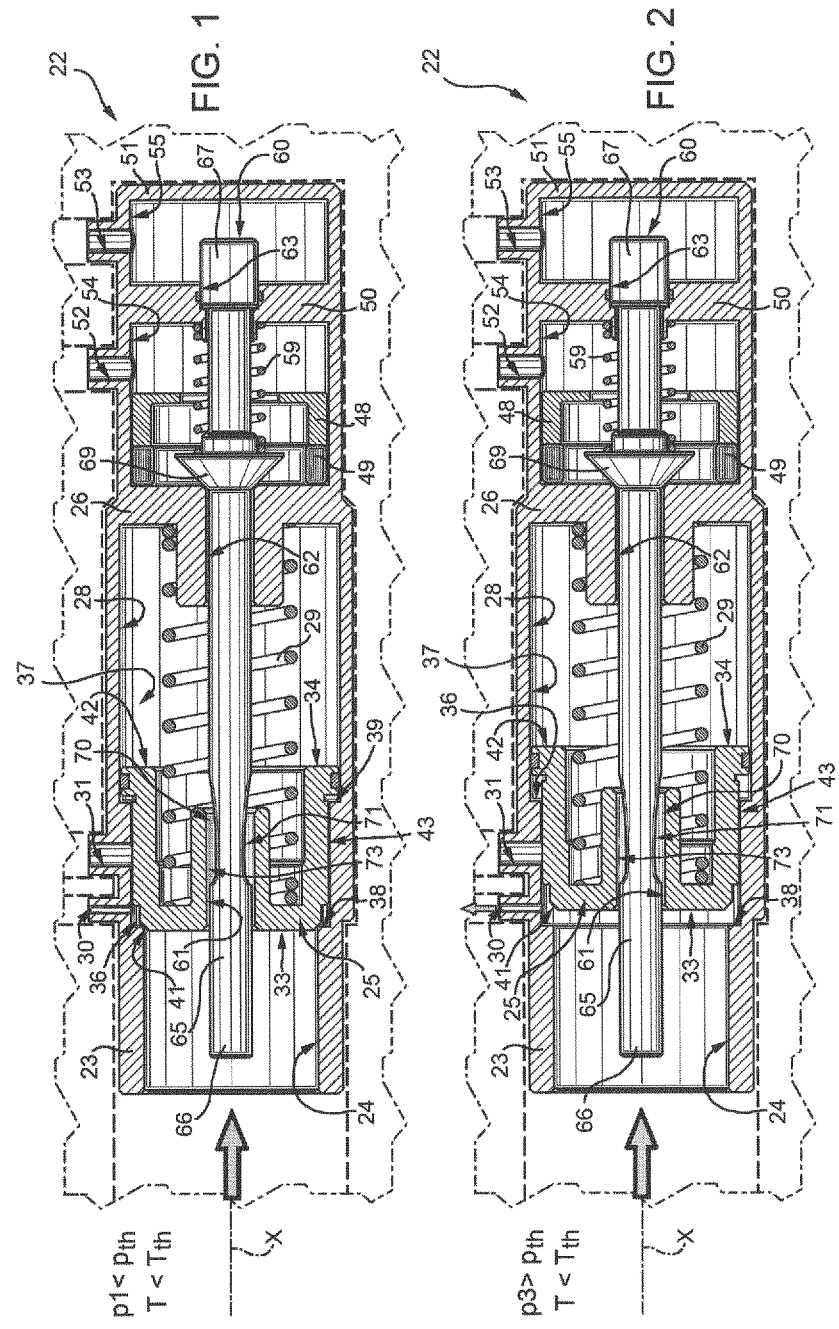

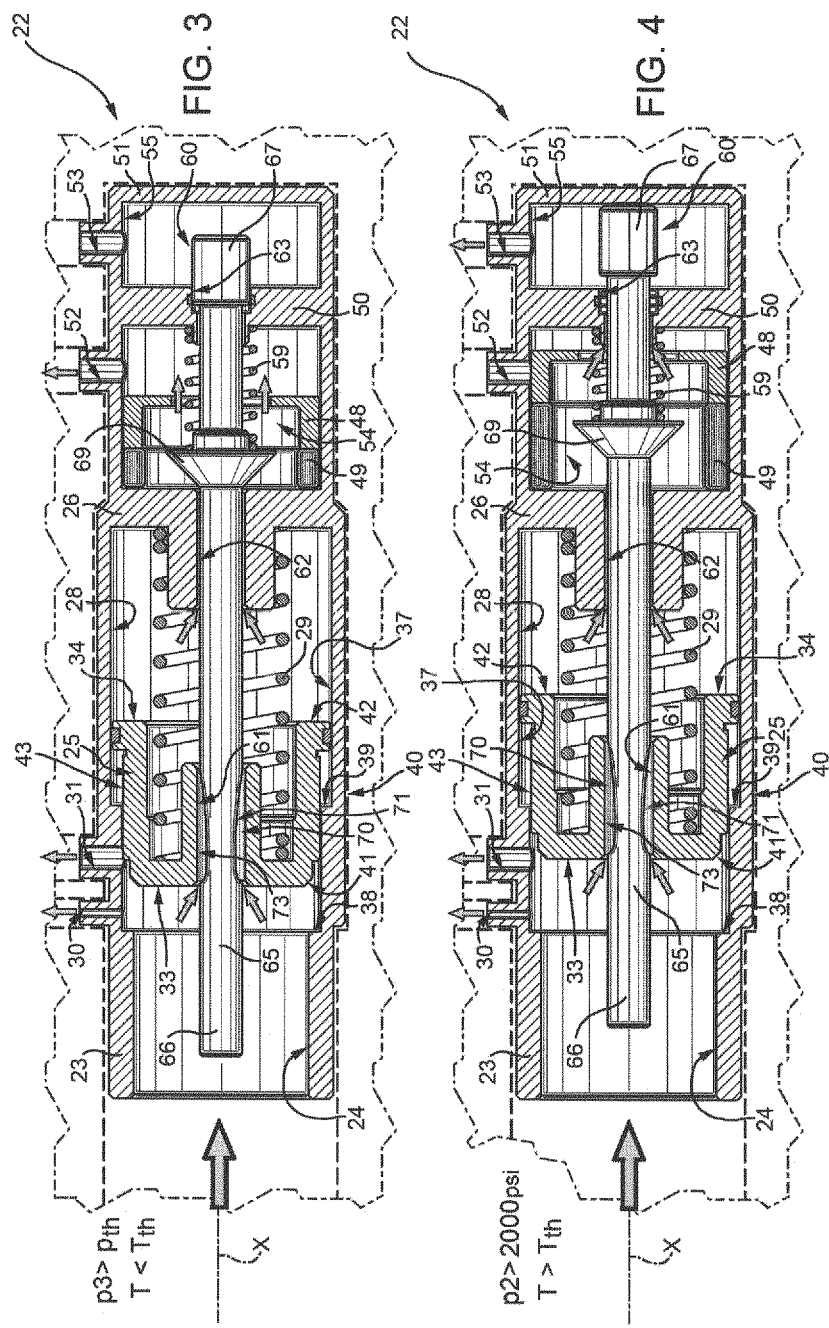

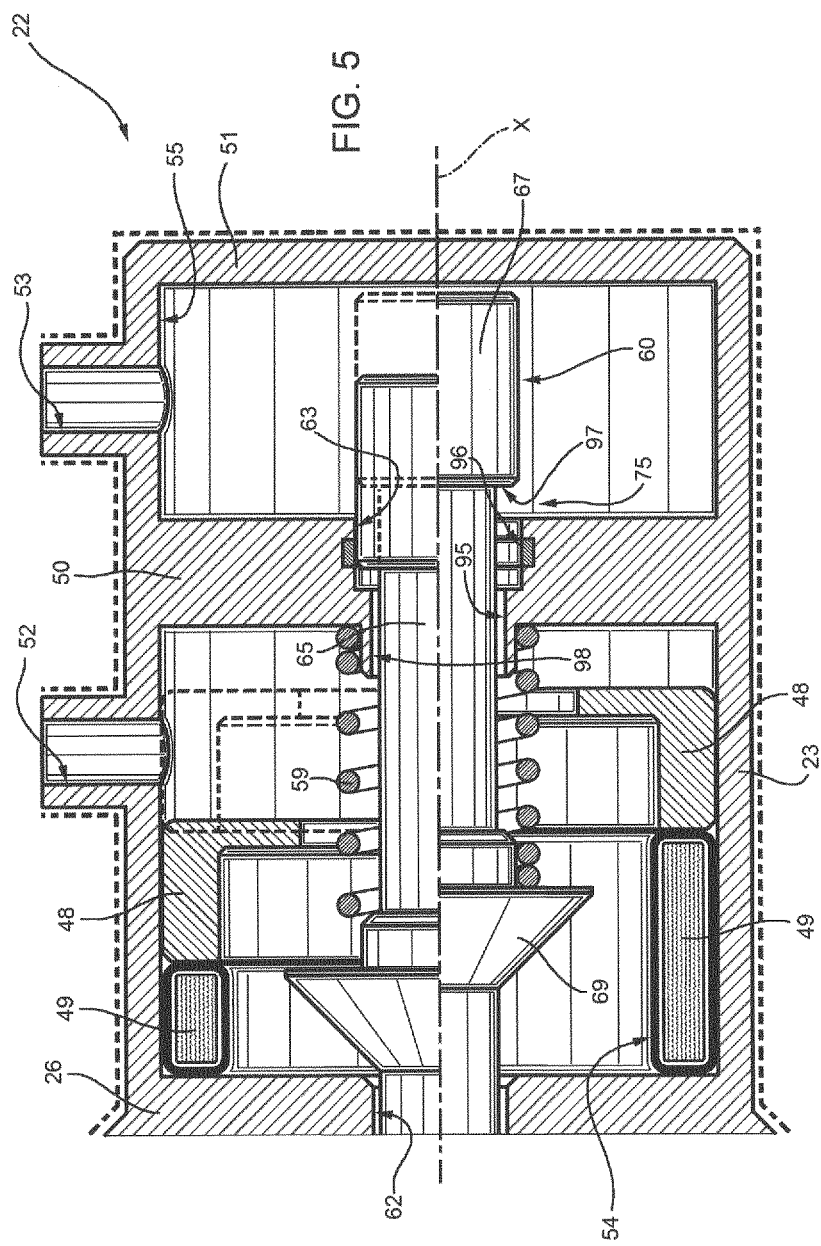

SAFETY VALVE AND METHOD FOR CONTROLLING A HYDRAULIC CIRCUIT

PRIORITY CLAIM

This application is a U.S. National Phase Application under 35 U.S.C. § 371 of International Patent Application No. PCT/EP2018/067488, filed Jun. 28, 2018, which claims priority from European Patent Application No. 17179435.7 filed on Jul. 3, 2017, all of which are incorporated by reference as if expressly set forth in their respective entireties herein.

TECHNICAL FIELD

The present invention relates to a safety valve, in particular for a hydraulic circuit comprising a variable-capacity volumetric pump.

The present invention likewise relates to a method for controlling a hydraulic circuit.

More precisely, the hydraulic circuit is designed to move one or more actuators of an aircraft.

BACKGROUND ART

Known, for example from U.S. Pat. No. 7,165,950, is a hydraulic circuit basically comprising:
 a variable-capacity volumetric pump having an inlet line and a pressure line;
 an oil reservoir fluidically connected to a return line of the hydraulic circuit; and
 one or more actuators, which each have a member that is mobile between two chambers, which are fluidically connected one to the pressure line of the pump and the other to the return line so as to generate a difference of pressure that displaces the mobile member of the actuator between one or more operating positions.

In particular, the volumetric pump transfers a given flow rate of oil from the inlet line to the pressure line.

The pump further comprises a controller, which regulates the delivery of the pump according to the pressure present in the hydraulic circuit.

In the case of actuators that perform functions indispensable for the lift/manoeuvrability of the aircraft it is of fundamental importance to prevent any possible breakdown of the hydraulic circuit from jeopardising the safety of the aircraft itself.

A first modality of breakdown of the hydraulic circuit is caused by an overheating of the oil circulating within the hydraulic circuit owing to causes independent of operation of the pump up to a temperature higher than the one that can be withstood by the pipes of the hydraulic circuit itself.

A further modality of breakdown of the hydraulic circuit arises in the case where the pressure value of the outlet line of the pump exceeds a threshold value that the actuator is able to withstand.

This further modality of breakdown arises, for example, when the compensator of the pump gets blocked in any position associated to a constant delivery of the pump itself, to which there corresponds a pressure in the hydraulic circuit higher than the normal operating value, which must be limited by the threshold value identified above.

The possible breakdown of the pressure compensator, in addition to determining an increase in the pressure of the oil circulating within the hydraulic circuit, also constitutes a further cause of increase in temperature of the oil itself.

In fact, the increase in the output pressure of the pump inevitably increases the mechanical work performed on the oil. This work, by adding to the inevitable friction, brings about overheating of the oil circulating in the hydraulic circuit up to a temperature that could prove dangerous for the integrity of the hydraulic circuit itself.

In order to mitigate the risk of damage to the actuator, hydraulic circuits of a known type described for example in U.S. Pat. No. 7,165,950 comprise a safety valve, which is set along a by-pass line fluidically set between the pressure line and the return line of the pump.

The above safety valve is substantially a pressure-relief valve calibrated on a pre-set pressure corresponding to an appropriate fraction of the aforesaid threshold value that the actuator is able to withstand.

In greater detail, the pressure-relief valve fluidically connects the pressure line of the pump to the return line through the by-pass line of the actuator in the case where the pressure within the hydraulic circuit exceeds the threshold value. Otherwise, the pressure-relief valve keeps the by-pass line closed and fluidically connects the pressure line of the pump and the actuator in the case where the pressure in the hydraulic circuit is lower than the threshold value.

In order to contain the aforementioned heating of the oil, hydraulic circuits of a known type further comprise a heat-exchanger, which enables cooling of the oil and is commonly set along the by-pass line.

The use of the above heat-exchanger inevitably constitutes a burden in terms of production and maintenance and increases the overall weight of the hydraulic circuit itself, with evident disadvantages, which are particularly felt in the sector of aeroplanes and helicopters.

Moreover, the use of a heat-exchanger enables maintenance of the temperature of the oil below the temperature threshold value only for a pre-set period of time in the case of particularly severe breakdown.

In order to guarantee correct functionality of the actuators at the end of said pre-set period of time, aircraft of a known type comprise a plurality of hydraulic circuits all connected to the same actuators.

In other words, in the event of breakdown, operation of the hydraulic circuit during breakdown is interrupted, and the further hydraulic circuits ensure proper operation of the actuators.

There is felt, in the sector, the need to ensure a certain residual degree of functionality for the hydraulic circuit in the case of overheating of the oil above the value that can be withstood by the hydraulic circuit, in a reliable, substantially automatic, way for an indefinite period of time and without an excessive increase in the weight of the hydraulic circuit.

There is moreover felt in the sector, the need to associate the residual degree of functionality ensured for the hydraulic circuit to the actual severity of the breakdown of the pump.

Finally, there is felt in the sector the need to contain overheating of the oil by reducing the volume of the heat-exchanger or even eliminating altogether the heat-exchanger itself.

GB-A-22 02613, U.S. Pat. Nos. 2,740,586 and 2,810,527 disclose a safety valve for a hydraulic circuit according to the preamble of claim 1.

U.S. Pat. No. 7,165,950 disclose a method for controlling a hydraulic circuit according to the preamble of claim 13.

DISCLOSURE OF INVENTION

The aim of the present invention is to provide a safety valve for a hydraulic circuit, which will enable at least one of the aforesaid needs to be met in a simple and economical advantageous way.

The aforesaid aim is achieved by the present invention in so far as it relates to a safety valve for a hydraulic circuit according to what is defined in claim 1.

The present invention likewise regards a method for controlling a hydraulic circuit, according to what is defined in claim 13.

BRIEF DESCRIPTION OF THE DRAWINGS

For a better understanding of the present invention, a preferred embodiment is described in what follows, purely by way of non-limiting example, with reference to the attached drawings, wherein:

FIG. 1 illustrates a safety valve for a hydraulic circuit provided according to the teachings of the present invention, in a first operating condition;

FIG. 2 illustrates the safety valve of FIG. 1, in a second operating condition;

FIG. 3 illustrates the safety valve of FIGS. 1 and 2, in a third operating condition;

FIG. 4 illustrates safety valve of FIG. 1, in a fourth operating condition;

FIG. 5 illustrates at a particularly enlarged scale some details of the safety valve of FIGS. 1 and 4;

BEST MODE FOR CARRYING OUT THE INVENTION

Figure 7:
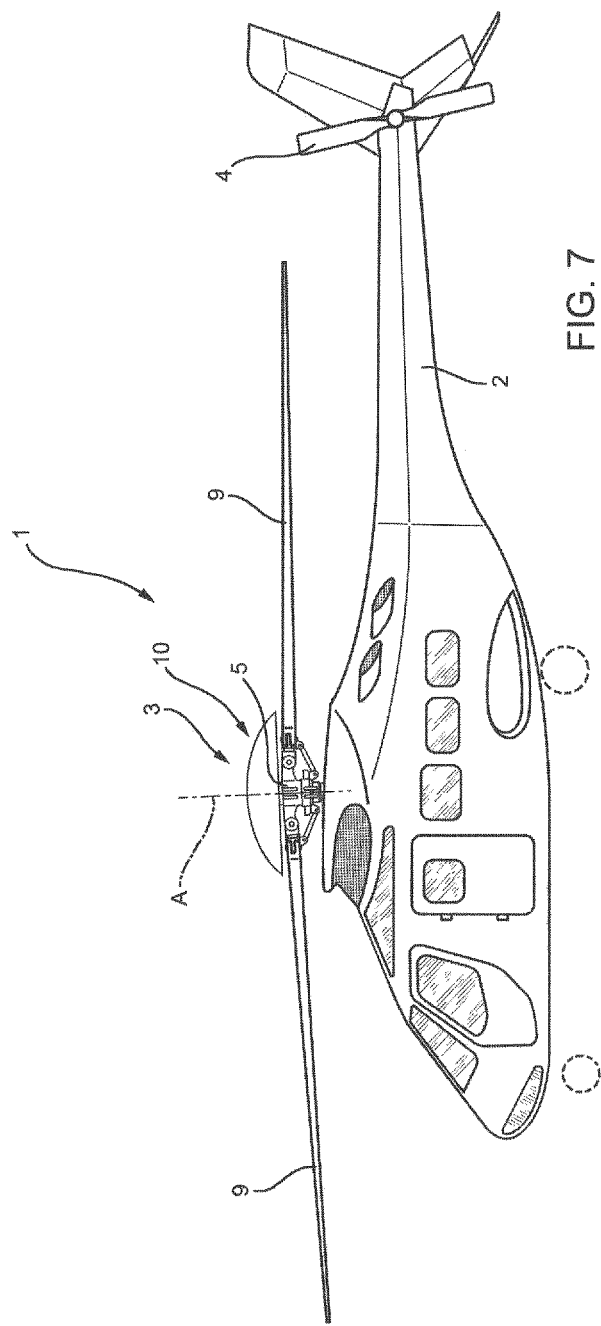
FIG. 7 illustrates an aircraft, in particular a helicopter, on which the valve of FIGS. 1 to 4 is installed.

With reference to FIG. 7, designated by 1 is an aircraft capable of fixed-point flight, in particular a helicopter basically comprising a fuselage 2, a main rotor 3 set at a top of the fuselage 2 and rotatable about an axis A, and a tail rotor 4 set at an end of the fuselage 2 and rotatable about an its own axis transverse to the axis A.

In greater detail, the rotor 3 comprises a hub 5 of axis A, which is hollow and carries in cantilever fashion a plurality of blades 9, which extend radially with respect to the axis A.

The rotor 3 further comprises a control shaft 6 rotatable about the axis A, angularly fixed with respect to the hub 5 and coupled, in a way not illustrated, to an engine member, for example a turbine, carried by the helicopter 1.

Figure 6:
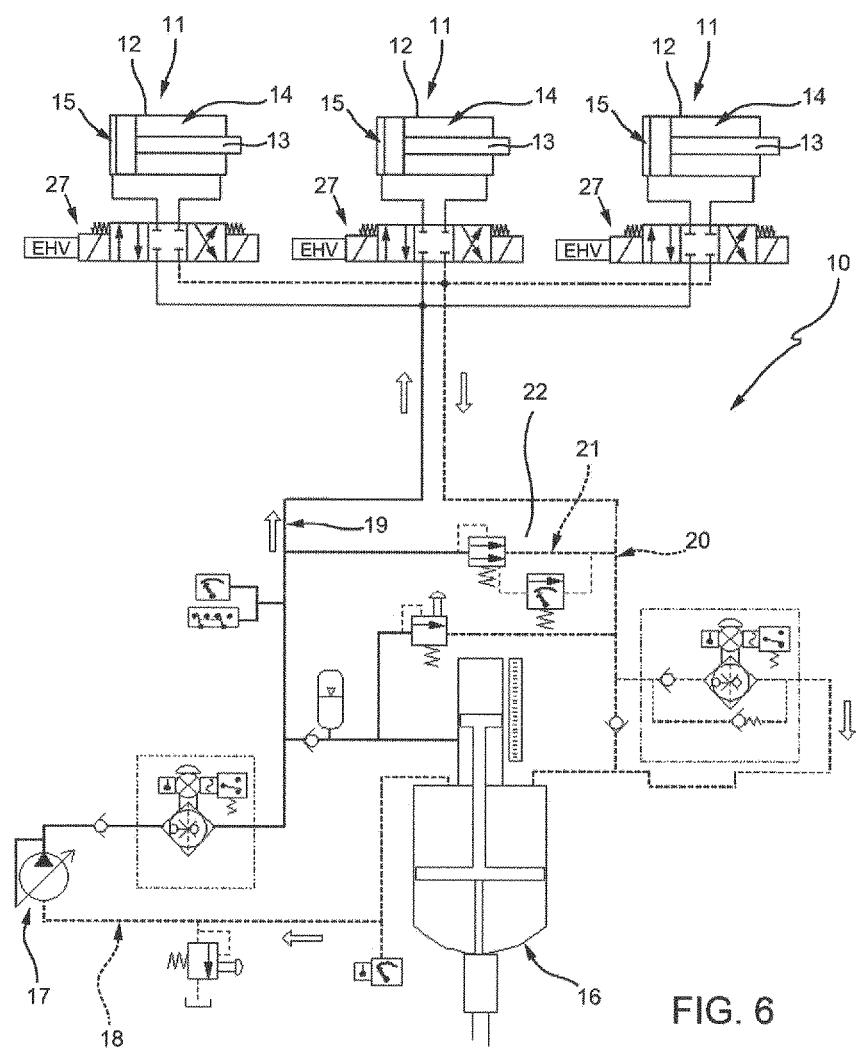
FIG. 6 illustrates a hydraulic circuit for an actuator of an aircraft comprising the valve of FIGS. 1 to 5.

With particular reference to FIG. 6, the helicopter 1 comprises:
  a plurality of hydraulic circuits 10, only one of which is illustrated; and
  a plurality of actuators 11, only some of which are illustrated, which are designed to move a respective drive of the helicopter 1 and are served by the hydraulic circuits 10.

As illustrated in FIG. 6, each hydraulic circuit 10 serves a plurality of actuators 11, three in the case in point illustrated.

It should be emphasised that the helicopter 1 comprises, for each actuator 11, two or more hydraulic circuits 10 temporarily connected to the actuator 11.

In this way, even in the case of a breakdown of one hydraulic circuit 10, the latter can be isolated from the actuator 11, and the remaining hydraulic circuits 10 preserve the functionality of the actuator 11.

In the sequel of the present description, reference will be made, for simplicity, to just one hydraulic circuit 10 and to just one actuator 11, all the hydraulic circuits 10 and the actuators 11 being substantially identical to one another.

In the case in point illustrated, each actuator 11 basically comprises:
  a casing 12 housing a mobile member 13; and
  a pair of chambers 14, 15 delimited between the casing 12 and the mobile member 13.

The hydraulic circuit 10 basically comprises:
  a reservoir 16 containing a hydraulic fluid, which, in the case in point, is oil;
  a pump 17 having an inlet line 18 for the oil fluidically connected to the reservoir 16 and a pressure line 19 for the oil fluidically connected in a selective way to the chamber 14 (or 15) of the actuator 11;
  a return line 20 fluidically connected in a selective way to the chamber 15 (or 14) of the actuator 11 and to the reservoir 16; and
  a by-pass line 21, which fluidically connects in a selective way the pressure line 19 and the return line 20.

In particular, the pump 17 is a variable-capacity volumetric pump. Said pump 17 transfers a regulatable flow rate of oil from the inlet line 18 to the pressure line 19. In an embodiment, the pump 17 is of the volumetric type with axial pistons, as illustrated in FIG. 1 of U.S. Pat. No. 7,165,950. The pressure in the return line 20 and, hence, in the chamber 14 (or 15) connected thereto is a function of the flow rate transferred by the pump 17 and of the flow rate that possibly passes along the by-pass line 21. More precisely, the higher (the lower, and in the limit, zero) the flow rate that passes along the by-pass line 21, the lower the differential pressure acting on the actuator 11.

The hydraulic circuit 10 further comprises:
  a control servo valve 27 (known as EHV, i.e., electro-hydraulic valve), which can be set without solution of continuity either in a first position or a second position in which it fluidically connects the chambers 14, 15 or 15, 14, respectively, to the pressure line 19 and to the return line 20; and
  a safety valve 22, which is set along the by-pass line 21.

It should be emphasised that the actuator 11 has a threshold value of difference in pressure between the chambers 14, 15 that is not to be exceeded in order not to risk the actuator 11 becoming mechanically damaged. This pressure threshold value is uniquely associated to a pressure threshold value pth of the oil that flows in the pressure line 19 from the pump 17. In the case in point, this pressure threshold value pth is 3650 psi.

The hydraulic circuit 10 moreover has a temperature threshold value Tth of the oil not to be exceeded in order not to risk damage to the hydraulic circuit 10 itself. In the case in point, this temperature threshold value Tth is 120° C.

The valve 22 is designed to preserve at least in part functionality of the actuator 11 in the event of breakdown of the hydraulic circuit 10, in particular in the case of overheating of the oil circulating within the hydraulic circuit 10.

The above overheating may be caused, by way of example, by:
  a heat source, for example a fire, acting on the hydraulic circuit 10; and/or
  a breakdown of the compensator of the pump 17, which remains blocked in a position in which it establishes a constant-pressure working point for the pump 17, to which there corresponds a pressure of the pressure line 19 higher than the pressure threshold value pth; this breakdown inevitably also brings about an increase in the temperature Tth of the oil; in fact, as the pressure in the pressure line 19 increases, the mechanical work exerted by the pump 17 on the oil that flows in the hydraulic circuit 10 increases; this increase in mechanical work brings about, jointly with the inevitable friction that is exerted on the oil within the hydraulic circuit 10, an increase in temperature of the oil above the temperature threshold value Tth.

The valve 22 also performs the function of a pressure-relief valve.

In greater detail, as will emerge from the sequel of the present description, the valve 22 selectively:
fluidically connects the pressure line 19 and the reservoir 16 via the by-pass line 21, excluding the actuator 11 in the case where the pressure of the oil in the pressure line 19 is higher than the pressure threshold value pth, deflecting part of the flow rate along the by-pass line 21, thus limiting the pressure of the oil in the pressure line 19 to the pressure threshold value pth; and
prevents fluid connection between the pressure line 19 and the reservoir 16 along the by-pass line 21 in the case where the pressure of the oil in the pressure line 19 is lower than the pressure threshold value pth.

The valve 22 performs the aforesaid functions in the case where the pressure of the oil in the pressure line reaches the pressure threshold value pth either for a limited period of time, for example on account of hammering, or on account of a permanent breakdown of the pump 17.

In greater detail (FIGS. 1 to 4), the valve 22 comprises a casing 23, which defines:
a chamber 24 fluidically connected to the pressure line 19 of the pump 17;
a shutter 25, which is mobile within the casing 23 along an axis X and axially delimits the chamber 24; and
a wall divider 26, which extends radially with respect to the axis X.

The casing 23 further comprises a plurality of openings 30, 31, which are fluidically connected to the return line 20 and are radial with respect to the axis X.

In the case in point illustrated, the casing 23 is tubular with axis X.

In the attached figures, just one opening 30 and just one opening 31 are illustrated.

Each opening 30 presents a hydraulic resistance to the passage of the oil higher than the hydraulic resistance presented by each opening 31.

More precisely, the openings 30, 31 are cylindrical, with respective axes orthogonal to the axis X.

The diameter of each opening 30 is smaller than the diameter of each opening 31.

Each opening 31 is set between a corresponding opening 30 and the wall divider 26, in a direction parallel to the axis X.

The wall divider 26, the shutter 25, and the portion of the casing 23, which extends between them, define a chamber 28.

The chamber 28 is set on the axially opposite side of the chamber 24 with respect to the shutter 25.

The shutter 25 in turn comprises:
an axial end surface 33 facing the inside of the chamber 24; and
a surface 34, which is axially opposed to the surface 33 and faces the inside of the chamber 28.

The valve 22 further comprises an elastic element 29 and a helical spring mounted so that it shares the axis X, set between the diaphragm 26 and the surface 34 of the shutter 25.

The shutter 25 is mobile along the axis X under the action of the forces resulting from the pressures existing in the chambers 24, 28 and applied on the surfaces 33, 34, and of the elastic force exerted by the elastic element 29.

In greater detail, the shutter 25 is mobile between:
a closed position (FIG. 1), in which it occludes the openings 30, 31, thus preventing fluid connection between the chamber 24—and hence the pressure line 19—and the return line 20; and
a completely open position (FIG. 4), in which it leaves both of the openings 30, 31 free, thus enabling fluid connection between the chamber 24—and, hence, the pressure line 19—and the return line 20.

The elastic element 29 has a pre-loading such as to keep the shutter 25 in the closed position (FIG. 1), when the pressure p1 in the pressure line 19 is lower than the pressure threshold value pth, i.e., in the case in point, lower than 3650 psi.

The shutter 25 is mobile along the axis X between a plurality of positions of partial opening (FIGS. 2 and 3), which are intermediate between the closed position and the position of total opening.

In greater detail, the shutter 25 can be set in:
a first partially open position (FIG. 2), in which it uncovers the opening 30 and occludes the opening 31, enabling fluid connection between the chamber 24—and, hence, the pressure line 19—and the return line 20 via the opening 30 alone; and
a second partially open position (FIG. 3), in which it uncovers the opening 30 and a part of the opening 31, enabling fluid connection between the chamber 24—and, hence, the pressure line 19—and the return line 20 via the opening 30 and the portion of the opening 31 left uncovered by the shutter 25 itself.

In the case in point illustrated, the second partially open position (FIG. 3) of the shutter 25 is set between the first partially open position (FIG. 2) and the completely open position (FIG. 4).

The shutter 25 further comprises a radially external tubular surface 40 sealingly co-operating with the casing 23 and the openings 30, 31 and axially set between the surfaces 33, 34.

The tubular surface 40 in turn comprises:
a pair of axial end stretches 41, 42; and
a main stretch 43, which is axially set between the stretches 41, 42 and sealingly co-operates with the casing 23 and the openings 30, 31 and is set between the surfaces 33, 34.

The stretch 43 has a greater length than the stretches 41, 42. In the case in point, the stretch 41 is, at least in part, inclined by 45° with respect to the axis X.

The stretch 41 is set on the side of the chamber 24 and has a diameter smaller than the diameter of the stretch 43. The stretch 41 is moreover designed to bear upon a shoulder 38 of the casing 23 when the shutter 25 is in the completely closed position (FIG. 1). In this condition, the shoulder 38, the stretch 41, and an end of the stretch 43 adjacent to the stretch 41 define between them a closed chamber 37 (FIG. 1) in fluidic communication with the opening 30 and fluidically isolated from the chamber 24.

Otherwise, the stretch 41 is set at a progressively greater distance along the axis X and set on the opposite side of the wall divider 26 with respect to the shoulder 39 itself, when the shutter 25 is set in the first and second partially open positions and in the completely open position (FIGS. 2, 3, and 4).

The stretch 42 is set on the same side as the chamber 28 and has a diameter larger than the diameter of the stretch 43. The stretch 42 is moreover set axially at a distance along the axis X from a shoulder 39 of the casing 23 and set on the same side as the diaphragm 26 with respect to the shoulder 39, when the shutter 25 is in the completely closed position (FIG. 1.

Moreover, the stretch 42 is set at a progressively greater distance along the axis X from the shoulder 39 itself, when the shutter 25 is set in the first and second partially open positions and in the completely open position (FIGS. 2, 3, and 4). The shoulder 39 is axially set between the shoulder 38 and the wall divider 26 along the axis X.

The surfaces 33, 34 extend radially with respect to the axis X.

The shoulders 39, 38 are defined by a radially inner surface 37 of the casing 23. The surface 37 delimits the chambers 24, 28, 54, 55 and is traversed by the openings 30, 31, 52 and 53.

Advantageously, the valve 22 comprises a thermally expandable element 49, which can be displaced, as a result of the temperature of the hydraulic fluid, between:
a first configuration (FIGS. 1 to 3) that it assumes when the temperature of the oil is below the temperature threshold value Tth; and
a second configuration (FIG. 4) that it assumes when the temperature of the oil is above the temperature threshold value Tth and in which it holds the shutter 25 in the completely open position, or displaces it into that position, so as to reduce the pressure in the chamber 24.

In greater detail, the casing 23 of the valve 22 comprises:
a second wall divider 50, which is set on the axially opposite side of the wall divider 26 with respect to the chamber 24 and extends parallel to the wall divider 26 and radially with respect to the axis X;
a end wall 51, which is set on the axially opposite side of the second wall divider 50 with respect to the wall divider 26 and extends parallel to the wall divider 26, 50 and radially with respect to the axis X;
a plurality of openings 52 (just one of which is illustrated in the attached figures), set axially along the axis X between the wall divider 26, 50; and
a plurality of openings 53 (just one of which is illustrated in the attached figures), set axially along the axis X between the diaphragm 50 and the end wall 51.

The openings 52, 53 are cylindrical and with respective axes that are radial with respect to the axis X.

Preferably, the diameters of the openings 52, 53 are the same as one another and equal to the diameter of the openings 30.

The valve 22 further comprises:
a chamber 54, which is axially set between the wall divider 26 and 50 and houses the element 49; and
a chamber 55, axially delimited between the wall divider 50 and the end wall 51.

The openings 52, 53 open towards the inside of the chambers 54, 55.

The element 49 is fixed to the second wall divider 50 and is free to undergo axial deformation within the chamber 54 on the side axially opposite to the second wall divider 50.

In the case in point illustrated, the element 49 is tubular.

The valve 22 further comprises a further element 48 fixed to the element 49 on the same side as the diaphragm 50 and free on the opposite side of the diaphragm 50.

When the element 49 is set in the first configuration, it keeps the element 48 at a distance from the opening 52 along the axis X (FIGS. 1, 2, and 3). In this way, the opening 52 remains open towards the inside of the chamber 54, when the element 49 is set in the first configuration.

In the case illustrated, the elements 48, 49 are tubular.

Instead, when the element 49 is set in the second configuration, lengthening thereof is such as to set the element 48 in a position where it closes the opening 52. In this way, the opening 52 remains fluidically isolated from the chamber 54, when the element 49 is set in the second configuration.

The valve 22 further comprises:
a further shutter 60 elongated along the axis X and slidable along the axis X within the casing 23; and
an elastic element 59, which in the case illustrated is a helical spring sharing the axis X, set axially between the second wall divider 50 and the shutter 60 itself.

In greater detail, the shutter 60 is able to slide coaxially with respect to the shutter 25 within a through hole 61 made in the shutter 25.

The shutter 60 is likewise able to slide within a hole 62 sharing the axis X defined by the diaphragm 26, and a hole 63, which shares the axis X and is coaxial to the hole 62 and is defined by the second wall divider 50.

The shutter 60 comprises, in particular:
a stem 65;
an end 66 housed within the chamber 24 and consequently subject to the pressure existing within the chamber 24; and
an end 67, opposite to the end 66 and projecting radially from the stem 65.

The shutter 60 further comprises a projection 69, which is frustoconical in the case illustrated, is axially set between the ends 66, 67, and is housed in the chamber 54.

The projection 69 and the stem 65 moreover pass through the elements 49, 48 and are set radially at a distance therefrom with respect to the axis X.

The elastic element 59 is fixed to the projection 69.

The shutter 60 is able to slide between a first position (FIG. 1) and a second position (FIG. 4).

Displacement of the shutter 60 from the first position (FIGS. 1 and 2) to the second position (FIG. 4) corresponds to a translation of the shutter 60 itself along the axis X and from the chamber 24 towards the end wall 51.

When the shutter 60 is set in the first position (FIG. 1), the projection 69 bears upon the hole 62, and the end 67 obstructs the hole 63.

In this first position, a negligible amount (not illustrated in FIG. 1) of oil is allowed to seep, on account the inevitable mechanical play involved, via the hole 62, from the chamber 28 to the chamber 54.

In this way, when the shutter 60 is set in the first position, the chambers 54, 55 are fluidically isolated from one another and the chambers 28, 54 are fluidically isolated from one another except for the seepage of the negligible amount of oil.

Consequently, the shutter 25 remains in the completely closed position, and the entire flow rate of oil supplied by the pump 17 reaches the chamber 14 (or 15) at the actuator 11.

Instead, when the shutter 60 is set in the second position (FIG. 4), the projection 69 is set axially at a distance along the axis X from the hole 62, and the end 67 is set axially at a distance along the axis X from the hole 63.

Owing to the fact that the shutter 60 is set or kept in the second position by the element 49 set in the second configuration, the opening 52 is occluded, and the chambers 28, 54 and 54, 55 are fluidically connected together.

Consequently, when the element 49 is set in the second configuration and the shutter 60 is set in the second position, a flow rate of oil higher than the seepage flow rate passes from the chamber 28 to the chamber 55 through the chamber 54 and reaches the return line 20 via the opening 53.

In this condition, exit of the oil from the chamber 28 brings about a reduction in pressure of the oil within the chamber 28. Consequently, the shutter 25 moves towards the diaphragm 26 and the end wall 51 until it reaches the completely open position, in which the oil exits from the chamber 24 to the return line 20 via the openings 30, 31.

The stem 65 further comprises a stretch 70 completely housed within the shutter 25 when the shutter 60 is in the second position and partially housed within the shutter 60 when the shutter 60 is in the first position.

The stretch 70 comprises a surface 71 with material removed, which extends at radial distances that first decrease and then increase from the shutter 25, proceeding along the shutter 60 parallel to the axis X and from the end 66 towards the end 67.

The stretch 70 of the stem 65 and the shutter 25 define a calibrated passage 73 for the oil between the chambers 24, 28.

The shutter 60 can moreover be set in a third position (FIG. 3), which is axially set along the axis X between the first and second positions of the shutter 60 itself.

When the shutter 60 is set in the third position (FIG. 2), the projection 69 is set axially at a distance from the hole 62, enabling passage of a certain flow rate of oil between the chambers 28, 54, and the end 67 is still sealingly housed within the hole 63, fluidically isolating the chambers 54, 55 from one another.

In this way, the chambers 28, 54 are fluidically connected together.

In the case (as in FIG. 3) where the shutter 60 is set in the third position by the pressure of the oil acting on the end 66 and where the oil is at a temperature lower than the temperature threshold value Tth, the element 49 leaves the opening 52 uncovered. Consequently, the oil flows from the chamber 28 to the chamber 54 via the hole 62 and from the chamber 54 to the return line 20 via the opening 52.

Also in this case, the flow rate of oil from the chamber 28 to the chamber 54 reduces the pressure of the oil itself inside the chamber 28, causing displacement of the shutter 25 from the closed position (FIG. 1) to the first partially open position (FIG. 2) and to the second partially open position (FIG. 3). In these positions, the oil moves from the chamber 28 to the return line 20, respectively, via just the opening (FIG. 2) and via the opening 30 and the portion of the opening 31 (FIG. 3) uncovered by the shutter 25, thus reducing the pressure within the chamber 24 and the pressure line 19 below the pressure threshold value pth.

The elastic element 59 exerts a pre-loading on the shutter 60, which holds it in the first position when the pressure in the chambers 24, 28 is lower than the pressure threshold value pth. Instead, when the pressure in the chamber 24 exceeds the pressure threshold value pth, the resulting force exceeds the elastic force exerted by the elastic element 59, thus causing translation of the shutter 60 from the first position to the second position.

With particular reference to FIG. 5, the hole 63 comprises, proceeding from the chamber 54 to the chamber 55 in a direction parallel to the axis X:
- a stretch 95 set on the same side as the chamber 54; and
- a stretch 96 set on the same side as the chamber 55 and having a diameter larger than the diameter of the stretch 95. The end 67 has a diameter larger than the stem 65 and has substantially the same diameter as the stretch 96.

The end 67 has an end surface 75, which is set on the same side as the chamber 54, adjacent to the stem 65 and defines an annulus 97. In particular, the outer and inner diameters of the annulus 97, respectively, than the outer diameters of the projection 69 and of the stem 65.

The stem 65 has a diameter smaller than the diameter of the stretch 95 of the hole 63. The stem 65 and the stretch 95 define between them a tubular passage 98.

When the shutter 60 is set in the first and third positions (FIGS. 1 and 3, respectively), the projection 69 engages the stretch 96, and the portion of the stem 65 adjacent to the projection 69 occupies the stretch 95.

In these first and third positions (FIG. 5), the annular portion 97 is fluidically connected to the chamber 54 via the passage 98. The oil hence exerts on the passage 98 the pressure existing in the chamber 54.

Operation of the hydraulic circuit 10 is described with reference to a single actuator 11 and to a single control valve 27.

The pump 17 transfers a regulatable flow rate of oil from the inlet line 18 connected to the reservoir 16 to the pressure line 19.

According to the position of the control servo valve 27, the oil flows from the pressure line 19 to the chamber 14 (15) of the actuator 11 fluidically connected thereto, while the chamber 15 (14) of the actuator 11 is fluidically connected to the reservoir 16 via the return line 20. The difference in pressure between the chambers 14, 15 generates driving of the actuator 11.

The pressure of the oil in the pressure line 19 and hence inside the chamber 14 (or 15) of the actuator 11 varies according to the flow rate that possibly passes through the by-pass line 21.

Operation of the hydraulic circuit 10 is described in what follows starting from the configuration of FIG. 1, where the pump 17 is not in a condition of breakdown, and the temperature of the oil in the hydraulic circuit 10 is compatible with operation of the actuator 11.

In this configuration, the pressure p1 of the oil along the pressure line 19 of the pump 17 is lower than the pressure threshold value pth, and the temperature of the oil is lower than the temperature threshold value Tth. By way of example, the pressure p1 of the oil along the pressure line 19 is kept constant at 3000 psi by the flow rate of the pump 17, and the temperature is lower than 120° C.

The pressure within the chambers 24, 28 is equal to p1 in so far as the chamber 24 is fluidically connected to the pressure line 19 and the chamber 28 is fluidically connected to the chamber 24 via the calibrated passage 73 between the shutters 25, 60. It should be emphasised that in this condition there is not a continuous flow rate through the passage 73 determined by a pressure gradient, but simply the oil at the pressure p1 occupies both of the chambers 24, 28.

The shutter 25 is kept by the elastic element 29 in the corresponding closed position, in which it occludes the openings 30, 31. Consequently, the valve 22 prevents flow rate of oil in the by-pass line 21 between the pressure line 19 and the return line 20.

The elastic element 59 holds the shutter 60 in the respective first position in which the projection 69 bears upon the hole 62 and the end 67 sealingly engages the hole 63. In this way, a flow rate of oil seeps between the chambers 28, 54, whereas the chambers 54, 55 are fluidically isolated from one another.

Since the temperature of the oil is lower than the temperature threshold value Tth, the element 49 remains in the corresponding first configuration, where the element 48 leaves the opening 52 uncovered. In particular, the minimal flow rate of oil that seeps from the chamber 54 to the chamber 55 exits from the opening 52 towards the by-pass line 21.

With reference to FIG. 4, the configuration of the valve 22 is illustrated in the case where the temperature of the oil exceeds the temperature threshold value Tth, by way of example in the case where the temperature of the oil exceeds the value of 120° C.

This increase in temperature may be caused, for example, by a localized heat source in the hydraulic circuit 10 or else by an increase in pressure in the pressure line 19 due to a breakdown of the pump 17. In fact, this increase in pressure inevitably brings about an increase in the work performed on the oil. This work, together with the inevitable friction, causes overheating of the oil itself.

Irrespective of the causes that have generated it, the increase in temperature brings about overheating of the element 49. This overheating is favoured by the fact that the overheated oil is present in the chamber 54.

Following upon its own overheating, the element 49 displaces from the corresponding first configuration (illustrated in FIG. 1) to the corresponding second configuration (illustrated in FIG. 4) as a result of thermal expansion.

During displacement towards the corresponding second configuration, the element 49 displaces the element 48 towards the second wall divider 50 and the end wall 51, up to a position in which the element 48 occludes the opening 52.

The oil present in the chamber 54 can no longer flow through the opening 52 that is closed by the element 48 and exerts a pressure on the annular portion 97 of the end 67 of the stem 65. This pressure determines an axial force on the shutter 60 sufficient to displace it into the respective second position, where the projection 69 is axially set at a distance from the hole 62 and the end 67 frees the hole 63.

Consequently, the oil flows from the chamber 54 to the chamber reducing the pressure within the chamber 54 itself and causing displacement of the shutter 25 into the corresponding completely open position. In addition, the oil exits from the chamber 55 through the opening 53.

In this completely open position, the shutter 25 uncovers the openings 30, 31 and enables the oil to flow from the chamber 24 to the return line 20 along the by-pass line 21.

Consequently, the pressure within the chamber 24 drops to a value p2 lower than p1. This value p2 is, in the case in point, 2000 psi.

It follows that the chamber 14 (or 15) fluidically connected to the pressure line 19 of the pump 17, the actuator 11 is occupied by oil at the pressure p2. The actuator 11 can thus continue to function, albeit with performance degraded.

In addition, the energy transmitted to the oil by the work performed thereon at the pressure p2 and by the inevitable friction drops to a value such that it can be dissipated along the hydraulic circuit 10 so that the temperature of the oil remains below the temperature threshold value Tth.

It should be emphasised that the lower flow rate of oil that flows through the opening 53 is a control flow rate aimed at controlling displacement of the shutter 60 along the axis X, whereas the higher flow rate of oil that flows through the openings 30, 31 is aimed at reducing the pressure in the chamber 24 down to the pressure value p2.

With reference to FIG. 2, described hereinafter is operation of the valve 22 in the case where the pump 17 is not in condition of breakdown, but the pressure of the oil that flows along the pressure line 19 instantaneously shifts to a value p3 higher than the pressure threshold value pth for a limited period of time, for example on account of hammering.

In this situation, the oil within the chambers 24, 28 shifts to the value p3 and causes a force on the shutter 25 sufficient to overcome the elastic action of the elastic element 29. Consequently, the shutter 25 shifts into the first partially open position, in which it uncovers the opening 30 and covers the opening 31.

There is thus generated a flow rate of oil from the chamber 24 to the return line 20 via the by-pass line 21 with consequent drop in pressure below the pressure threshold value pth in the pressure line 19 and in the chamber 14 (or 15) of the actuator 11.

The increase in pressure in the chamber 24 is not sufficient to displace the shutter 60, which consequently remains in the corresponding first position, where it fluidically isolates from one another the chambers 28, 54, except for seepage, and the chambers 54, 55.

When the pressure value of the oil that flows along the pressure line 19 returns to a value lower than the pressure threshold value pth, the pressure of the oil in the chambers 24, 28 drops until the shutter 25 is brought back into the completely closed position.

With reference to FIG. 3, described hereinafter is operation of the valve 22 in the case where the pump 17 has a permanent breakdown such as to bring the pressure of the oil that flows along the pressure line 19 to the value p3 higher than or equal to the pressure threshold value pth.

In this situation, the oil within the chambers 24, 28 shifts to the value p3 and determines a force on the shutter 25 sufficient to overcome the elastic action of the elastic element 29. Consequently, the shutter 25 shifts axially towards the end wall 51 until it reaches the second partially open position, where it uncovers the opening 30 and part of the opening 31.

In addition, the pressure p3 within the chambers 24 increases the force on the end 66 until this force exceeds the elastic action of the elastic element 59. The shutter 60 thus reaches the third position, in which the projection 69 uncovers the hole 62, whereas the end 67 remains sealingly housed within the hole 63. It follows that a flow rate of oil is generated, which passes from the chamber 28 to the chamber 54 via the hole 62 and from the chamber 54 to the by-pass line 21 through the opening 52. The chambers 54, 55 remain fluidically isolated from one another.

The flow rate of oil through the holes 62 and the opening 52 reduces the pressure in the chamber 28 so as to displace the shutter 25 into the second partially open position where it fluidically connects the openings 30, 31 to the chamber 24. There is thus generated a flow rate of oil along the by-pass line 21 between the pressure line 19 and the return line 20. This flow rate of oil causes a drop in pressure in the pressure line 19 and in the chamber 14 (or 15) below the pressure threshold value pth.

In this way, notwithstanding breakdown of the pump 17, the actuator 11 continues to be supplied with an oil at a pressure value equal to the pressure threshold value pth and continues to function properly.

It should be emphasised that, also with reference to the conditions of FIG. 3, the lower flow rate of oil that passes through the opening 52 is a control flow rate aimed at controlling displacement of the shutters 25, 60 along the axis X, whereas whilst the higher flow rate of oil that passes through the openings 30, 31 is aimed at reducing the pressure in the chamber 24.

From the foregoing, the advantages of the valve 22 and of the control method according to the invention emerge clearly.

In particular, the element 49 assumes the first configuration (FIGS. 1 to 3) when the temperature of the oil is below the temperature threshold Tth and the second configuration when the temperature of the oil is above the temperature threshold Tth. When the element 49 assumes the second configuration (FIG. 4), it causes displacement of the shutter 60 into the second position or maintenance thereof in said position, where the shutter 60 fluidically connects the chambers 28, 54 and 54, 55. This brings about reduction of the pressure in the chamber 28, displacement of the shutter 25 into the completely open position, passage of a flow rate through the openings 30, 31 and by-pass line 21, and consequent drop in pressure in the pressure line 19 to the value p2 lower than the pressure threshold value pth.

In this way, when the temperature of the oil exceeds the temperature threshold value Tth, the pressure in the output line 19 automatically drops to a value p2 such that the hydraulic circuit 10 is able to dissipate the thermal energy transmitted thereto by the work performed by the pump 17 and by the inevitable friction.

It should be emphasised that the element 49 assumes the second configuration both when the increase in the temperature of the oil is caused by a breakdown of the pump 17 and when it is due to a cause independent of the pump 17, for example a fire in the proximity of some components of the hydraulic circuit 10, with consequent overheating of the oil.

Thanks to this, the valve 22 enables management of the problem of overheating of the oil, irrespective of the causes that have generated it, in a reliable and fast way, without introduction of additional weights and for an indeterminate period of time.

There is thus avoided the need to use an excessive redundancy of hydraulic circuits 10 connected to one and the same actuator 10. Moreover, the hydraulic circuit 10 does not require a heat-exchanger for cooling the oil, thus being particularly light, simple to produce and to maintain, with evident advantages in the aeroplane or helicopter sector.

Furthermore, the valve 22 ensures that the pressure in the pressure line 19 remains at a value p2 lower than the value p1 but in any case, sufficient to guarantee a certain functionality of the actuators 11.

The surface 71 of the shutter 60 extends at variable distances in a direction radial with respect to the shutter 25. Thanks to this, the flow rate of oil that passes between the chambers 24, 28 and 28, 55 when the element 49 assumes the second configuration is variable as a function of the relative position between the shutters 25, 60. Consequently, the higher the temperature of the oil, the higher the flow rate of oil that passes between the chambers 24, 28 and 28, 55, and the lower the pressure in the chamber 24 and in the pressure line 19.

It is thus possible to regulate gradually the pressure in the pressure line 19 and hence the effective degradation of the degree of functionality of the actuators 11 as a function of the effective severity of the breakdown of the compensator of the pump 17, by fractioning the reduction in pressure in the chamber 24 to a value intermediate between pth and p2. In other words, in the case of partial breakdown of the compensator, the pressure in the chamber 24 is reduced to values higher than 2000 psi, with evident improvement of functionality of the actuators 11.

The valve 22 enables, in addition to the functions specified above and with a single integrated component:

sudden reduction of the pressure within the pressure line 19 below the pressure threshold value pth, in the case of possible pressure peaks in the pressure line 19, due for example to hammering (FIG. 2); and permanent reduction of the pressure within the pressure line 19 below the threshold value pth in the case of breakdown of the pump 17 due, for example, to jamming of the compensator in the position of maximum flow rate.

Finally, the stretch 41 of the shutter 25 is set radially at a distance from the surface 37 of the casing 23, and bears upon the shoulder 39 when the shutter 25 is set in the first position (FIG. 1).

The stretch 41 is moreover set radially at a distance from the opening 30.

In this way, as soon as the sudden pressure peak arises (FIG. 2), displacement of the shutter 25 towards the diaphragm 26 determines fluid connection between the chamber 24 and the opening 30 and the consequent drop in pressure in the pressure line 19 and in the chamber 24 below the pressure threshold value pth.

Finally, it is clear that modifications and variations may be made to the valve 22 and to the control method described and illustrated herein, without thereby departing from the sphere of protection defined by the annexed claims.

In particular, the aircraft could be a convertiplane or an aeroplane, instead of the helicopter 1.

The invention claimed is:

1. A safety valve (22) for a hydraulic circuit (10) comprising a pump (17) designed to supply a hydraulic fluid at a first pressure value to a pressure line (19), said valve (22) comprising:
   a first supply chamber (24), which can be fluidically connected to said pressure line (19) and is designed to be filled with said hydraulic fluid at said first pressure value and at a first temperature value; and
   a casing (23) defining at least one first opening (30, 31), which can be fluidically connected to a reservoir (16) of said hydraulic circuit (10);
   a first shutter (25), which delimits said first chamber (24) and can be displaced between:
       a first position in which it occludes said first opening (30, 31) and prevents, in use, fluid connection between said first chamber (24) and said first opening (30, 31); and
       a second position, in which it leaves at least in part said first opening (30, 31) free and fluidically connects, in use, said first chamber (24) and said first opening (30, 31),
   said valve further comprising a thermally expandable element (49), which can be displaced, as a result of the temperature of said hydraulic fluid, between:
       a first configuration that it assumes, in use, when said hydraulic fluid is below a temperature threshold (Tth); and
       a second configuration that it assumes, in use, when said hydraulic fluid is above said temperature threshold (Tth) and in which, in use, it holds or displaces said first shutter (25) into or towards said second position so as to reduce the pressure in said first chamber (24);
   characterized in that said casing (23) comprises:
   a second chamber (28) delimited by said first shutter (25) and by a wall divider (26) carried by said casing (23);
   a third delimited chamber (54) of said wall divider (26), which can be filled with said hydraulic fluid and which houses said thermally deformable element (49) and defines at least one second opening (52) that can be fluidically connected to said reservoir (16);
   said thermally deformable element (49) leaving directly or indirectly free, in use, said second opening (52)

when it is set in said first configuration so as to generate a flow rate of said hydraulic fluid coming out of said third chamber (54);

said thermally deformable element (49) occluding, in use, directly or indirectly said second opening (52) when it is set in said second configuration;

said valve (22) comprising a second shutter (60), which is able to slide within said casing (23) and can be displaced between:

a corresponding first position, in which it allows, in use, only a seepage of said hydraulic fluid between said second and third chambers (28, 54) so as to deliver said hydraulic fluid into said third chamber (55); and a corresponding second position, in which it enables, in use, fluid connection between said second and third chambers (28, 54) so as to generate a flow of said hydraulic fluid between said second and third chambers (28, 54), with a flow rate higher than that of said seepage, and reduce, in use, the pressure within said second chamber (28);

said second shutter (60) comprising a stem (65) and a first projection (67) fluidically connected to said third chamber (54) so as to be subject, in use, to the pressure of said hydraulic fluid existing in said third chamber (54), when said second shutter (60) is set, in use, in said first position.

2. The valve according to claim 1, characterized in that said casing (23) comprises a fourth chamber (55) defining a third opening (53) which can be fluidically connected to said reservoir (16);

said third and fourth chambers (54, 55) being fluidically connected together via a first passage (63) when said second shutter (60) is in said second position, and being fluidically isolated when said second shutter (60) is in said first position.

3. The valve according to claim 2, characterized in that said first passage (63) comprises:

a first stretch (95) fluidically connected to said third chamber (54) and inside which said stem (65) is able to slide with clearance; and a second stretch (96) set between said first stretch (95) and said fourth chamber (55) and housed inside which is said first projection (67) when said second shutter (60) is set, in use, in said first position;

said first projection (67) having a diameter larger than the diameter of said stem (65).

4. The valve according to claim 1, characterized in that said second shutter (60) comprises:

a second projection (69) bearing upon a second passage (62) set between said second chamber (28) and said third chamber (54), and designed to allow said seepage when said second shutter (60) is in the first position; and/or an end (66) housed in said first chamber (24).

5. The valve according to claim 1, characterized in that said stem (65) is slidingly housed within said first shutter (25) and comprises a portion (71) with material removed in part housed within said first shutter (25);

said first and second shutters (25, 60) defining between them a third passage (73) for said hydraulic fluid between said first chamber (24) and said second chamber (28);

said third passage (73) comprising said portion (71) with material removed.

6. The valve according to claim 5, characterized in that said portion (71) with material removed of said stem (65) extends at a variable distance from said first shutter (25) proceeding in the direction of sliding (X) of said second shutter (60), in particular at distances first increasing and then decreasing.

7. The valve according to claim 1, characterized in that it comprises first elastic means (59) set between said casing (23) and said second shutter (60) and configured for pre-loading elastically said second shutter (60) in the corresponding said first position.

8. The valve according to claim 1, characterized in that it comprises second elastic means (29) set between said casing (23) and said first shutter (25) and configured for pre-loading elastically said first shutter (25) in the corresponding said first position; the pre-loading of said second elastic means (29) being associated to a pressure threshold value (pth) in such a way that said first shutter (25) will remain, in use, in the corresponding said first position when said first pressure value is lower than said pressure threshold value (pth) and will displace from said first position to said second position when said first pressure value is equal to or higher than said pressure threshold value (pth).

9. The valve according to claim 1, characterized in that it comprises two said first openings (30, 31) having respective fluid-dynamic resistances different from one another;

said first shutter (25) occluding, in use, both of said first openings (30, 31) when it is set in said first position;

said first shutter (25) uncovering, in use, both of said first openings (30, 31), when it is set in said second position;

said first shutter (25) moreover being displaceable into at least one third position intermediate between said first and second positions, in which it uncovers at least in part at least one (31) of said first openings (30, 31).

10. The valve according to claim 9, characterized in that said casing (23) comprises a first surface (37), which delimits at least said first chamber (24) and through which said first openings (30, 31) open; said first surface (37) further comprising a shoulder (39) set axially at a distance from said first openings (30, 31);

said first shutter (25) comprising a second surface (40) facing said first surface (37) and in turn comprising:

a first stretch (43) sealingly co-operating with said first surface (37) and set at the same level as said first openings (30, 31); and a second stretch (41) contiguous to said first stretch (43) and set radially at a distance from said first surface (37);

said first stretch (43) occluding one of said first openings (30, 31), and said second stretch (41) being set bearing upon said shoulder (39) of said first surface (37) so as to isolate fluidically said first chamber (24) and said first openings (30, 31) when said first shutter (25) is set in said first position.

11. A hydraulic circuit (10) comprising:

a reservoir (16) designed to contain a hydraulic fluid;

a pump (17), which has an inlet line (18) and a pressure line (19) and can be operated for supplying a regulatable flow rate of said hydraulic fluid to said pressure line (19);

an actuator (11) having a first chamber (14, 15; 15, 14), which is fluidically connected in a selective way to said pressure line (19), and a second chamber (15, 14; 14, 15), which can be fluidically connected in a selective way to said reservoir (16);

a by-pass line (21), which fluidically connects said pressure line (10) and said reservoir (16) by-passing said actuator (11); and a safety valve (22) according to claim 1 set along said by-pass line (21).

12. An aircraft comprising said actuator (11) and a plurality of said hydraulic circuits (10) according to claim 11, which are fluidically connected to said actuator (11).

13. A method for controlling a hydraulic circuit (10), said hydraulic circuit (10) comprising a pump (17) designed to supply a hydraulic fluid at a first pressure value to a pressure line (19) of the pump (17) itself;

said method comprising the steps of:
i) fluidically connecting a first supply chamber (24) of a safety valve (22) to said pressure line (19) so as to fill said first chamber (24) with said hydraulic fluid at said first pressure value and at a first temperature value;
ii) fluidically connecting at least one first opening (30, 31) of a casing (23) of said safety valve (22) to a reservoir (16) of said hydraulic circuit (10);
iii) displacing a first shutter (25) between:
a first position, in which it occludes said at least one first opening (30, 31) and prevents fluid connection between said first chamber (24) and said first opening (30, 31); and
a second position, in which it leaves said first opening (30, 31) at least in part free and fluidically connects said first chamber (24) and said first opening (30, 31);
said method being characterized in that it comprises the further steps of:
iv) displacing, as a result of the temperature of said hydraulic fluid, a thermally expandable element (49), which can be displaced between:
a first configuration, where it holds said first shutter (25) in said first position, when said hydraulic fluid is below said temperature threshold value (Tth); and
a second configuration, where it holds or displaces said first shutter (25) in or towards said second position, assumed when said hydraulic fluid is above said temperature threshold value (Tth) so as to reduce said first pressure value in said first chamber (24);
wherein said casing (23) comprises:
a second chamber (28) delimited by said first shutter (25) and by a wall divider (26); and
a third chamber (54) delimited by said first wall divider (26), housing said thermally deformable element (49) and defining at least one second opening (52), which can be fluidically connected to said reservoir (16);
said method further comprise receding s the further steps of:
v) leaving said second opening (52) free when said thermally deformable element (49) is set in said first configuration so as to generate a flow of said hydraulic fluid at output from said third chamber (54);
vi) occluding said second opening (52) when said thermally deformable element (49) is set in said second configuration;
vii) displacing a second shutter (60) between:
a corresponding first position, in which it enables only a seepage of said hydraulic fluid between said second and third chambers (28, 54) in order to deliver said hydraulic fluid into said third chamber (54); and
a corresponding second position, in which it enables a fluid connection between said second and third chambers (28, 54) so as to create a flow rate of said hydraulic fluid between said second and third chambers (28, 54) higher than the said seepage flow rate and reduce the pressure within said second chamber (24); and
viii) exposing a projection (67) of said second shutter (60) to the pressure existing within said third chamber (54), when said second shutter (60) is set in said corresponding second position.

* * * * *